Feb. 1, 1949. J. L. FORD 2,460,685
DIP POT FOR HOLDING MOLTEN SOLDER
Filed Oct. 8, 1945
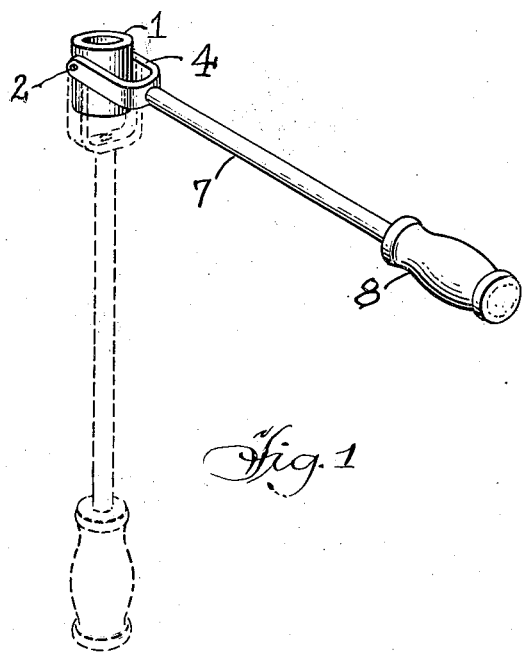
Fig. 1
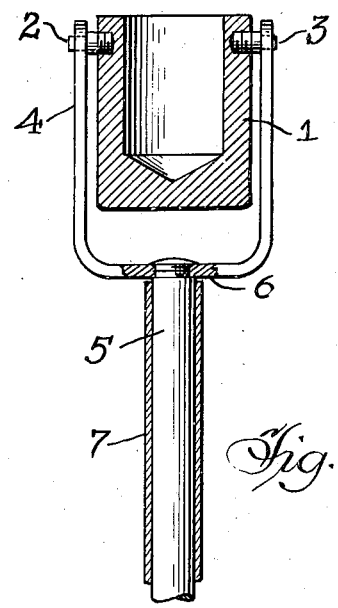
Fig. 2
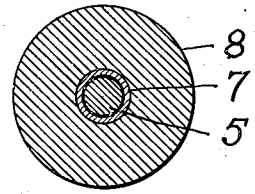
Fig. 3
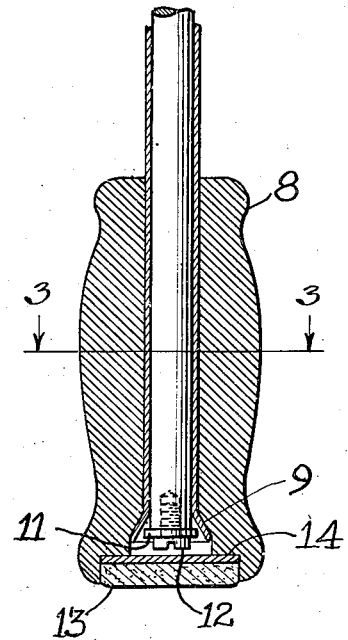
INVENTOR.
James L. Ford
BY
Frank J. Foley Atty.

Patented Feb. 1, 1949

2,460,685

UNITED STATES PATENT OFFICE 2,460,685

DIP POT FOR HOLDING MOLTEN SOLDER

James L. Ford, Chicago, Ill.

Application October 8, 1945, Serial No. 620,860

3 Claims. (Cl. 113—111)

This invention relates to improvements in a soldering device of the type known to electricians as a "dip pot" for holding molten solder, and which is mounted on a handle so that the solder may conveniently be applied to some object. For many years electricians have used some form of a dip pot for applying solder to electric wire connections fashioned in the form of "pig-tails" depending temporarily from electric fixtures, outlets, junction boxes, and other installations. The solder may thus be applied in quick succession to a number of previously prepared connections.

In performing this work rapidly, as is usually a requirement, many accidents have happened due to the spilling of the hot molten solder when the workmen fail to maintain the pot in an upright position.

My invention aims to provide a dip pot so swivelly mounted on a handle that the pot will always be maintained upright by gravity regardless of the movements of the handle.

The foregoing objective is attained by employing a simple but unique handle support which accurately controls the pot during use while allowing it to maintain its upright position.

Another object of the invention is to provide a mounting readily usable with a short handle and at the same time capable of being supported on a long pole or pipe temporarily without change of operation.

Other advantages of the invention will become apparent from a perusal of this specification.

In the drawing, which shows a preferred embodiment of the invention,

Fig. 1 is a perspective view of the device, including in dotted lines an illustration of another position of the handle without movement of the pot.

Fig. 2 is a central longitudinal sectional view of the device, as it would appear in a vertical position.

Fig. 3 is a sectional view on the line 3—3 of Fig. 2.

The pot 1 is, as usual, a relatively thick walled chamber which may be placed over an open flame to be preheated before receiving molten solder or to be heated to remelt cooled solder contained therein.

A pair of trunnions 2 and 3 are threaded or otherwise inserted into the sides of the pot near its open end at diametrically opposed points and are supported in a bail 4. A rod 5 is threadedly or otherwise fixedly engaged with the center of the cross bar 6 of the bail. A sleeve 7 having a close but easily revolving relation to the rod 5 surrounds the rod from the bail into the interior of a handle 8, which is preferably of wood or other material which would not conduct electricity from a "live" connection.

The handle is fixed by a tight fit or otherwise upon the sleeve, and one end of the sleeve is preferably flared outwardly as at 9 to assist in such a fixed relationship and to provide an enlarged space in which may be held a washer 11 of larger diameter than the rod 5 and to which it is secured by a screw 12. This washer prevents the sleeve from sliding off from the rod.

In order that the metal rod or sleeve within the hollow handle may not accidentally conduct electricity to the hand of the user I prefer to close the end of the handle with an insulating material filler 13 such as putty, plastic wood, or any other suitable plastic material. If desired a plate 14 positioned as shown may be provided as a fixed backing for the filler.

In the operation of the dip out, molten solder, not shown, is placed in the hollow interior of the pot and then may be raised to cause the "pig tail" connections to be dipped into the solder. Whether the handle extends vertically below the pot or in any other direction the pot will hang vertically on its trunnions and its weight will cause the trunnions to lie always along a horizontal line, thus causing the bail to maintain such a position that the trunnions will be horizontal. The rod 5 fixedly secured to the bail 4 may revolve freely inside sleeve 7 to accomplish that objective. Figure 1 illustrates two positions of the device.

It will now be understood that the dip pot supported in accordance with my invention can never be tipped and its contents spilled by reason of movements of the handle. When using this device the electrician need not keep one eye on the dip pot to observe if it is about to spill, as was formerly necessary.

The large and smooth area of contact between the rod and sleeve assures free relative rotation of these parts and absence of any frictional binding contact at any point that might interfere with the free "universal" swivel mounting of the dip pot.

The end of the sleeve abutting the bail cross member 6 limits the movement of the rod into the sleeve whenever the pot is higher than the handle, while washer 11 prevents the rod from pulling out of the sleeve when the pot is lowered. It is evident that the length of the device from the handle 8 to the bail will depend upon the needs of the users. Also an extension may easily be temporarily attached to the handle 8 if desired.

While I have shown and described a preferred embodiment of my invention, it should be understood that this invention is not to be limited to the precise details herein disclosed, but rather is subject to modification and variation within the limits of the invention described by the appended claims.

Having shown and described my invention, I claim:

1. A soldering device comprising a bail, a dip pot pivotally mounted near its open end between the end portions of the bail with its center of gravity substantially below its pivotal axis, a cylindrical rod having one end fixed to the center of the yoke portion of the bail, a cylindrical sleeve rotatably mounted on the rod and having one end abutting said yoke portion, a handle fixed upon and embracing the other end of said sleeve, an annular shoulder on the end of the sleeve within the handle, and annular shoulder means on the other end of the rod engaging said sleeve shoulder restraining longitudinal withdrawal of the sleeve from said rod during relative rotation of the rod and sleeve.

2. A soldering device comprising a bail, a dip pot pivotally mounted near its open end between the end portions of the bail with its center of gravity substantially below its pivotal axis, a cylindrical rod having one end fixed to the center of the yoke portion of the bail, a cylindrical sleeve rotatably mounted on the rod and having one end abutting said yoke portion, a handle fixed upon and embracing the other end of said sleeve, said handle having a reduced bore snugly fitting said sleeve and an enlarged bore at its rear end in which said sleeve terminates, said sleeve having an enlarged shoulder in said enlarged bore, and shoulder means on the rear end of the rod engaging said sleeve shoulder restraining longitudinal withdrawal of the sleeve from the rod during relative rotation of the sleeve and rod.

3. A soldering device comprising a bail, a dip pot pivotally mounted near its open end between the end portions of the bail with its center of gravity substantially below its pivotal axis, a rod having one end fixed to the center of the yoke portion of the bail, a cylindrical sleeve freely rotatably mounted on the rod, a handle fixed upon and embracing an end portion of the sleeve remote from said bail, and means restraining longitudinal separation of the rod and sleeve during relative rotation of the rod and sleeve.

JAMES L. FORD.

REFERENCES CITED

The following references are of record in the file of this patent:

UNITED STATES PATENTS

| Number | Name | Date |
|---|---|---|
| 1,169,103 | Richdale | Jan. 18, 1916 |
| 1,522,879 | Gregory | Jan. 13, 1925 |
| 1,818,925 | Brown | Aug. 11, 1931 |